UNITED STATES PATENT OFFICE.

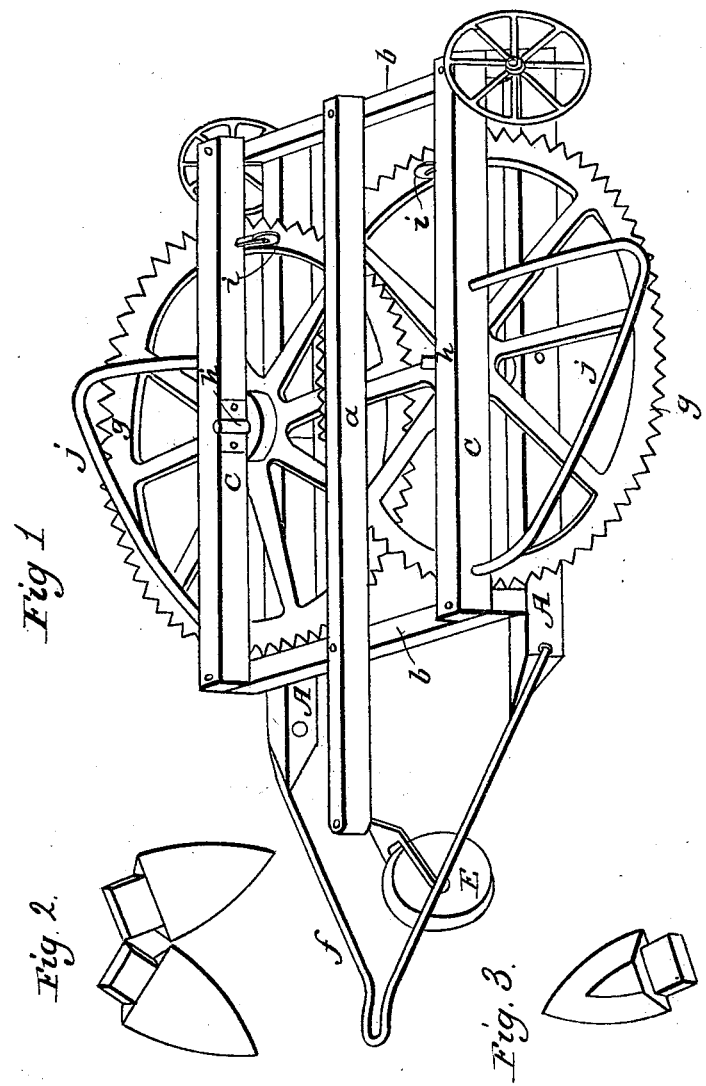

STEPHEN BOWERMAN, OF DETROIT, MICHIGAN.

IMPROVEMENT IN COTTON-STALK HARVESTERS.

Specification forming part of Letters Patent No. 7,677, dated October 1, 1850.

*To all whom it may concern:*

Be it known that I, STEPHEN BOWERMAN, of the city of Detroit, county of Wayne, and State of Michigan, have invented a new and improved useful machine for extracting cotton-stalks from land after the cotton has been gathered; and I do declare that the following is a full and exact description.

The nature of my invention consists in the construction of a frame of suitable width to pass between the rows or drills, and mounted on wheels for the purpose of being propelled by any power applied to it, which frame is also provided with two wheels, and attached to said frame by means of upright shafts in such a manner as will allow them to revolve with ease. Said wheels are provided with teeth attached to their rims, (not unlike large saw-teeth.) These wheels are made of a sufficient diameter to project far enough from the sides of the frame to allow the teeth to come in contact with the stalks, which are extracted by the operation of drawing the machine between the rows or drills.

To enable others skilled in the art to make and use my invention, I will proceed to describe its construction and operation, reference being had to the accompanying drawings, in which—

Figure 1 is a perspective of the machine; Fig. 2, two of the teeth, showing their positions in the wheels; Fig. 3 showing the under side of said teeth.

A A are two pieces of timber of any required length and size to support the wheels without springing. These timbers are connected together by cross-pieces $b$ $b$. Upon these cross-pieces are firmly attached two pieces of timber, $c$ $c$, running parallel with and directly over A A, having a space between the two sufficiently large to allow the wheels $g$ $g$ to revolve between them.

$d$ is a piece of timber running along the center of the frame, to the forward end of which is attached a caster-wheel, $e$; $f$, stirrup of iron, to which power is applied for drawing the machine; $g$ $g$, wheels with teeth; $h$ $h$, shafts, the lower end of which is supported by A A, the upper end by $c$ $c$.

$j$ $j$ are two triangular-shaped irons attached to the frame over the wheels $g$ $g$.

The operation of the machine is as follows: Power is applied to the stirrup $f$ and the machine is drawn between the rows or drills of cotton-plants, the stalks of which are grasped by the teeth of the wheels $g$ $g$ and extracted from the ground, and are carried back until they come in contact with the triangular pieces $j$ $j$, which disengage them from the teeth.

Figs. 2 and 3 represent the teeth of wheels $g$ $g$ as being sharp on their upper edge, so as to prevent the stalks from slipping.

What I claim as my invention, and desire to secure by Letters Patent, is—

The combination of two saw-teeth wheels with the frame, and supported thereby, and the triangular pieces of iron for disengaging the stalks, in the manner and for the purposes herein set forth.

STEPHEN BOWERMAN.

Witnesses:
ARETUS A. WILDER,
THOMAS J. WALKER.